United States Patent
Tashiro

(10) Patent No.: US 7,233,126 B2
(45) Date of Patent: Jun. 19, 2007

(54) BATTERY PACK HAVING AN ELECTRONIC STORAGE DEVICE

(75) Inventor: Kei Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 10/839,099

(22) Filed: May 5, 2004

(65) Prior Publication Data

US 2005/0001586 A1    Jan. 6, 2005

(30) Foreign Application Priority Data

May 7, 2003    (JP)    ............................. 2003-129082

(51) Int. Cl.
*H01M 10/46*    (2006.01)
(52) U.S. Cl. ..................................... 320/106
(58) Field of Classification Search ................ 320/106, 320/110, 112, 114, 115
See application file for complete search history.

(56) References Cited

U.S. PATENT DOCUMENTS 6,218,806 B1 *   4/2001   Brotto et al. ............... 320/106
6,563,290 B2 *   5/2003   Sakakibara et al. ......... 320/106
2003/0062872 A1 * 4/2003   Brotto ........................ 320/106

* cited by examiner

*Primary Examiner*—Edward H. Tso
(74) *Attorney, Agent, or Firm*—Frommer Lawrence & Haug LLP; William S. Frommer; Paul A. Levy

(57)    ABSTRACT

A battery pack includes a setting information storage device for storing setting information for setting the functions of an electronic device; a setting information control device for controlling, in accordance with a control signal for the electronic device, processes for writing and reading the setting information to and from the setting information storage device; and a communication device for transmitting and receiving the setting information, which is controlled by the setting information control device via the communication terminal. The electronic device includes a setting information operation device for controlling operations for writing and reading the setting information to and from the storage device of the battery pack; and a communication device for transmitting and receiving, via a communication terminal, the setting information, which is operated by the setting information operation device.

6 Claims, 10 Drawing Sheets

BATTERY PACK HAVING AN ELECTRONIC STORAGE DEVICE

BACKGROUND OF THE INVENTION

1. Field of the Invention

The present invention relates to a battery pack and an electronic device. More particularly, the present invention relates to a battery pack capable of recording setting information of an electronic device and to an electronic device capable of causing device setting information to be recorded in such a battery pack.

2. Description of the Related Art

In conventional technology, electronic devices in which a user can select and set a function possessed by the device according to the usage situation are known. For example, in video cameras, in order to improve the ease of operation, so-called "initialization" of setting functions, such as the electronic zoom, the recording (image recording) mode, and the on/off state of the automatic focus, can be performed, so that the setting information of the device can be customized to the optimum setting according to the preference of the user and the usage situation.

The setting information of the device which is "initialized" in this manner is stored in a storage device (for example, a RAM (Random Access Memory) and/or a ROM (Read Only Memory)) in the device, a memory card which is loadable into and removable from the device, and so on.

Furthermore, a video camera in which a mechanism for loading and removing a memory card into and from the battery pack is provided, which is loaded into the main unit of the video camera and which supplies electrical power thereto, so that still image data of the image which is being photographed by the video camera is recorded in the memory card so that it can be played back, has been developed (for example, see Japanese Unexamined Patent Application Publication No. 2001-78068 (page 4, FIG. 1)).

However, in the above-described electronic device, when the capacity of the connected battery pack runs out or the battery pack is detached, the supply of electrical power is cut, and the setting information cannot be held. Therefore, it is necessary to replace the battery pack with a new charged battery pack, and "initialization" needs to be performed again. Furthermore, when a device of the same type is borrowed, or a new device or an additional device of the same type is bought, "initialization" needs to be performed once more.

Furthermore, when setting information is to be stored in another recording medium such as a memory card, a mechanism for loading and removing the memory card, etc., and a communication terminal must be provided in the main unit of the electronic device, which makes the configuration complex, and this becomes an obstacle to size reduction of the main unit of the device.

On the other hand, in Japanese Unexamined Patent Application Publication No. 2001-78068 described above, the mechanism for loading and removing the memory card is provided on the battery pack side. However, setting information cannot be stored, and similarly to the above-described problems, since a slot and a communication terminal must be provided in the battery pack, the configuration becomes complex, and the cost is increased.

SUMMARY OF THE INVENTION

Accordingly, an object of the present invention is to provide a battery pack whose configuration is not complex and which can record and store setting information for setting the functions of an electronic device, and to provide an electronic device capable of storing the setting information in such a battery pack.

To achieve the above-mentioned object, in one aspect, the present invention provides a battery pack including: connection terminals, which are connected to an electronic device, for supplying electrical power to the device, and which are connected to a charger so as to charge the battery pack; and a communication terminal for performing data communication with the electronic device; setting information storage means for storing setting information for setting the functions of the electronic device; setting information control means for controlling, in accordance with a control signal for the electronic device, processes for writing and reading the setting information to and from the setting information storage means; and communication means for transmitting and receiving the setting information controlled by the setting information control means via the communication terminal.

In the battery pack of the present invention, the setting information storage means may store information on the electrical power of the battery pack together with the setting information.

In the battery pack of the present invention, the communication means may transmit the information on the electrical power of the battery pack via the communication terminal.

In another aspect, the present invention provides an electronic device that can be driven with a loaded battery pack having incorporated therein storage means for storing setting information for setting the functions of the device, the electronic device including: connection terminals, which are connected to the battery pack and which receive the supply of electrical power; a communication terminal, which is connected to the battery pack, for performing data communication; setting information operation means for controlling operations for writing and reading the setting information to and from the storage means of the battery pack; and communication means for transmitting and receiving, via the communication terminal, the setting information operated by the setting information operation means.

In the electronic device of the present invention, the setting information operation means may have a function for updating setting information set in the electronic device to setting information read from the storage means of the battery pack.

In the electronic device of the present invention, the setting information operation means may have functions for comparing the setting information read from the storage means of the battery pack with the setting information set in the electronic device, and for updating the setting information of the storage means of the battery pack or the setting information set in the electronic device to the most recent setting information.

As described above, the battery pack incorporates therein setting information storage means, setting information control means, and communication means. The communication means performs data communication with the electronic device, and the setting information control means controls, in accordance with a control signal for the electronic device, processes for writing and reading the setting information to and from the setting information storage means. Therefore, in the same way as in the conventional battery pack, the battery pack has a simple configuration having only the connection terminals and the communication terminal, and the setting information of the electronic device can be stored.

Furthermore, the electronic device includes setting information operation means for controlling the operations of writing and reading the setting information to and from the storage means of the battery pack; and communication means for transmitting and receiving, via the communication terminal, the setting information operated by the setting information operation means. Therefore, operations of writing and reading setting information to and from the storage means of the loaded battery pack can be controlled via the communication terminal.

As described in the foregoing, since the setting information of the electronic device is recorded in the memory incorporated in the battery pack, superior advantages can be obtained in that, if the battery pack is loaded into a device, device setting can be simply and easily performed without performing a setting operation once more.

Furthermore, when a device of the same type is borrowed, a new device of the same type is bought to replace the old one due to, for example, a failure of the device in use, or an additional device of the same type is bought, similarly, the device setting can be restored by merely loading the battery pack on hand into the device. If a plurality of battery packs are provided, it is also possible to store a corresponding number of pieces of setting information.

Furthermore, since a memory is incorporated in the battery pack, the configuration of the battery pack is simple, and connection terminals and a communication terminal that are identical to those of the conventional battery pack can also be used. Therefore, there are advantages in that the manufacturing cost can be reduced, and the battery pack can also be used in an electronic device in which a conventional battery pack is used.

On the other hand, in the electronic device, the configuration of the terminals which are connected to the battery pack may be of the same type as that of the conventional terminals. The mechanism for loading and removing the memory, the memory card, etc., for recording the setting information, is not necessary. Only the program (software) for performing control of the operations of writing and reading the setting information of the electronic device to and from the storage means of the battery pack needs to be changed. Therefore, the manufacturing cost can be reduced, and also, the size of the device can be reduced so that the portability thereof can be improved.

Furthermore, when initialization is performed during manufacturing of the electronic device, in the conventional case, initial setting information needs to be written with specialized equipment. However, since the setting information can be recorded in this battery pack, initialization can be performed at the same time as when the operation confirmation is performed by connecting the battery pack during device testing; therefore, there are advantages in that specialized equipment is not necessary, and the testing of the device can be simply and easily performed.

DESCRIPTION OF THE PREFERRED EMBODIMENTS

Embodiments of a battery pack and an electronic device according to the present invention will now be described below with reference to the drawings. However, the drawings are for explanation only, and do not limit the technical scope of the present invention.

Figure 1:
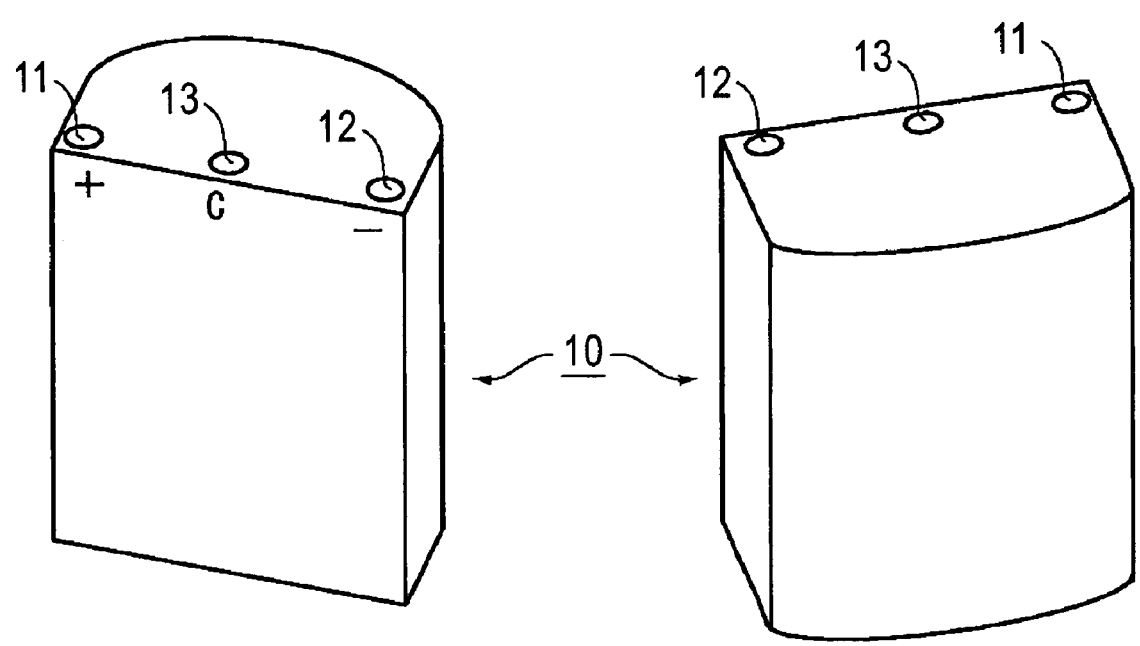
FIG. 1 is an exterior view showing an example of a battery pack according to the present invention.

FIG. 1 shows the exterior of a battery pack 10. The battery pack 10 includes a plus (+) terminal 11 and a minus (−) terminal 12, which are connected to an electronic device, for supplying electrical power thereto, and which are connected to a charger (not shown) so as to charge the battery pack, and a communication terminal 13 for performing data communication with the electronic device.

Figure 2:
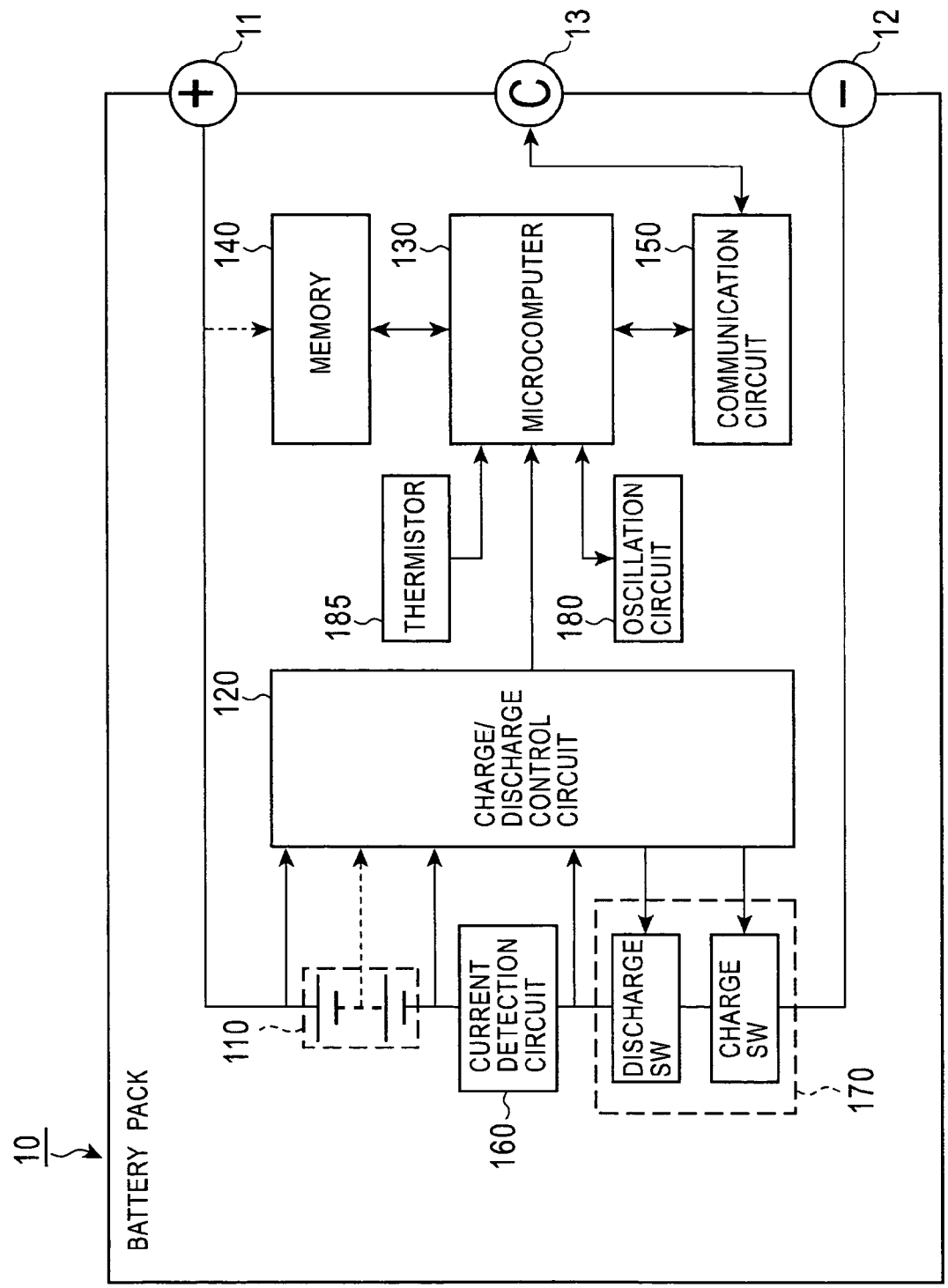
FIG. 2 is a block diagram schematically showing the internal configuration of the battery pack according to the present invention.

FIG. 2 is a block diagram showing, in a simplified manner, the internal configuration of the battery pack 10 shown in FIG. 1. The battery pack 10 includes a battery cell 110, a charge/discharge control circuit 120, a microcomputer 130, a memory 140, a communication circuit 150, a current detection circuit 160, a charge/discharge control switch 170, an oscillation circuit 180, a thermistor 185, and so on.

The battery cell 110 is charged from the charger (not shown) via the plus (+) terminal 11 and the minus (−) terminal 12 in accordance with the charge/discharge control switch 170, and supplies the charged electrical power to the loaded electronic device and each section of the battery pack 10.

The charge/discharge control circuit 120 controls the charge/discharge control switch 170, collects the information on the electrical current value detected by the current detection circuit 160 and the electrical power capacity of the battery cell 110 (hereinafter referred to as "battery cell information"), and sends the information to the microcomputer 130.

The microcomputer 130 operates in accordance with a timing signal of the oscillation circuit 180, and performs control of the operations of reading and writing data to and from the memory 140 and control of the communication circuit 150 in accordance with a control program and a control signal from the electronic device, which is sent via the communication circuit 150.

The memory 140 performs reading and writing of the setting information of the electronic device under the control of the microcomputer 130.

In a predetermined storage area of the memory 140, flag information indicating that the battery pack is a battery pack capable of storing setting information (hereinafter referred to as "battery category information") is recorded. It is discriminated whether or not the battery pack is a battery pack compatible with device setting and recording type by detecting the battery category information at the electronic device.

The memory 140 is configured so as to be capable of reading and writing battery cell information together with the setting information of the electronic device, so that the necessary memory area can be shared in the battery pack.

Furthermore, the memory 140 is configured in such a manner that flag information indicating whether writing (storage) of setting information in a predetermined storage area should be permitted and whether the setting information stored in the memory should be automatically updated (rewritten) (hereinafter referred to collectively as "writing permission information") can be set, making it possible to control the rewriting of the setting information.

This writing permission information can also be set by software from the electronic device, and a switch may be provided in the battery pack so that the writing permission information is set by switching the switch.

By configuring the memory 140 in such a manner that electrical power is supplied from the battery cell 110, a memory having a large storage capacity can be incorporated.

The communication circuit 150 performs a data communication process with the electronic device via the communication terminal 13 under the control of the microcomputer 130 in order to send the setting information and the battery cell information stored in the memory 140 to the electronic device and in order to transfer the setting information sent from the electronic device to the microcomputer 130.

The communication terminal 13 for transmitting and receiving the setting information is configured so as to also serve as a communication terminal used to send battery cell information in the conventional battery pack. This makes it possible to use this battery pack also in an electronic device in which a conventional battery pack is used.

The current detection circuit 160 detects the value of the electrical current applied to the battery cell 110 and sends the detected electrical current value to the charge/discharge control circuit 120.

The charge/discharge control switch 170 switches between charge and discharge of the battery cell 110 in accordance with the charge SW (switch) and the discharge SW under the control of the charge/discharge control circuit 120.

The oscillation circuit 180 generates a timing signal which serves as a reference for processing/control operations in the battery pack and supplies it to the microcomputer 130.

The thermistor 185 detects the temperature of the interior of the battery pack and sends the detected interior temperature data to the microcomputer 130.

A description will now be given below of the configuration when the battery pack 10 shown in FIG. 2 is connected to the electronic device.

Figure 3:
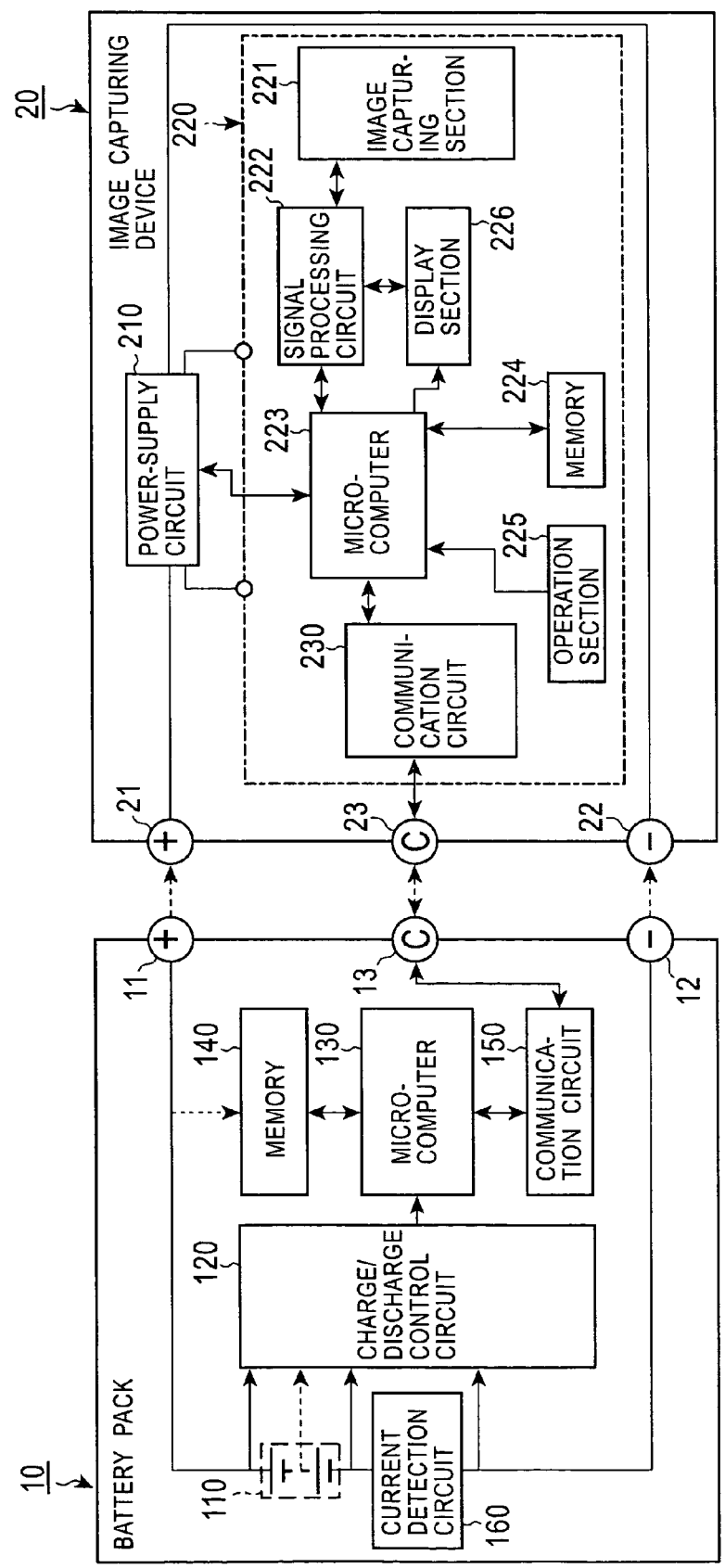
FIG. 3 is a block diagram schematically showing the configuration when the battery pack of FIG. 2 is loaded into an image capturing device (electronic device)

FIG. 3 is a block diagram showing as an example, in a simplified manner, a configuration when the battery pack 10 is connected to an image capturing device 20, which is an electronic device.

The battery pack 10 has the same configuration as in FIG. 2, and accordingly, the description thereof is omitted. The illustration of the charge/discharge control switch 170, the oscillation circuit 180, and the thermistor 185 is omitted.

The image capturing device 20, which is an electronic device, includes a power-supply circuit 210 and a main circuit 220 which operates by the power feed from the power-supply circuit 210. The main circuit 220 includes an image capturing section 221, a signal processing circuit 222, a microcomputer 223, a memory 224, an operation section 225, a display section 226, a communication circuit 230, and so on.

The power-supply circuit 210 supplies the electrical power obtained from the power source such as the battery pack 10 to the main circuit 220 via a plus (+) terminal 21 and a minus (−) terminal 22.

The image capturing section 221 of the main circuit 220 captures light from a subject to be photographed, converts it into a video signal, and sends it to the signal processing circuit 222.

The signal processing circuit 222 of the main circuit 220 performs, under the control of the microcomputer 223, predetermined signal processing, such as correction processing (correction processing of white balance, gradation, luminance, color, etc.), on a video signal sent from the image capturing section 221, and sends the result to the display section 226, etc.

The microcomputer 223 of the main circuit 220 controls the sections of the main circuit 220 in accordance with a control programs and operation information from the user, which is sent via the operation section 225.

Furthermore, when the microcomputer 223 obtains the battery category information recorded in the memory 140 of the battery pack 10 via the communication circuit 230, the microcomputer 223 discriminates whether or not the battery pack 10 is a battery pack compatible with device setting and recording type.

The memory 224 of the main circuit 220 stores the setting information set via the operation section 225, and the setting information and the battery cell information obtained via the communication circuit 230, reads this information stored in the memory, and sends it to the microcomputer 223, or deletes the information.

The operation section 225 of the main circuit 220 sends, to the microcomputer 223, the setting information set by the user operation, and operation information such as operation instructions to the device.

The display section 226 of the main circuit 220 displays, under the control of the microcomputer 223, a video signal from the signal processing circuit 222 and data from the microcomputer 223 on a liquid-crystal screen or an EVF (Electronic View Finder).

The communication circuit 230 of the main circuit 220 performs, under the control of the microcomputer 223, a data communication process with the battery pack 10 via a communication terminal 23, sends the setting information stored in the memory 224 to the battery pack 10, and transfers the setting information and the battery cell information sent from the battery pack 10 to the microcomputer 223.

Next, referring to FIGS. 4 and 5, the operating state of the battery pack and the electronic device will now be described by using as an example a configuration in which the battery pack 10 shown in FIG. 3 is connected to the image capturing device 20.

Figure 4:
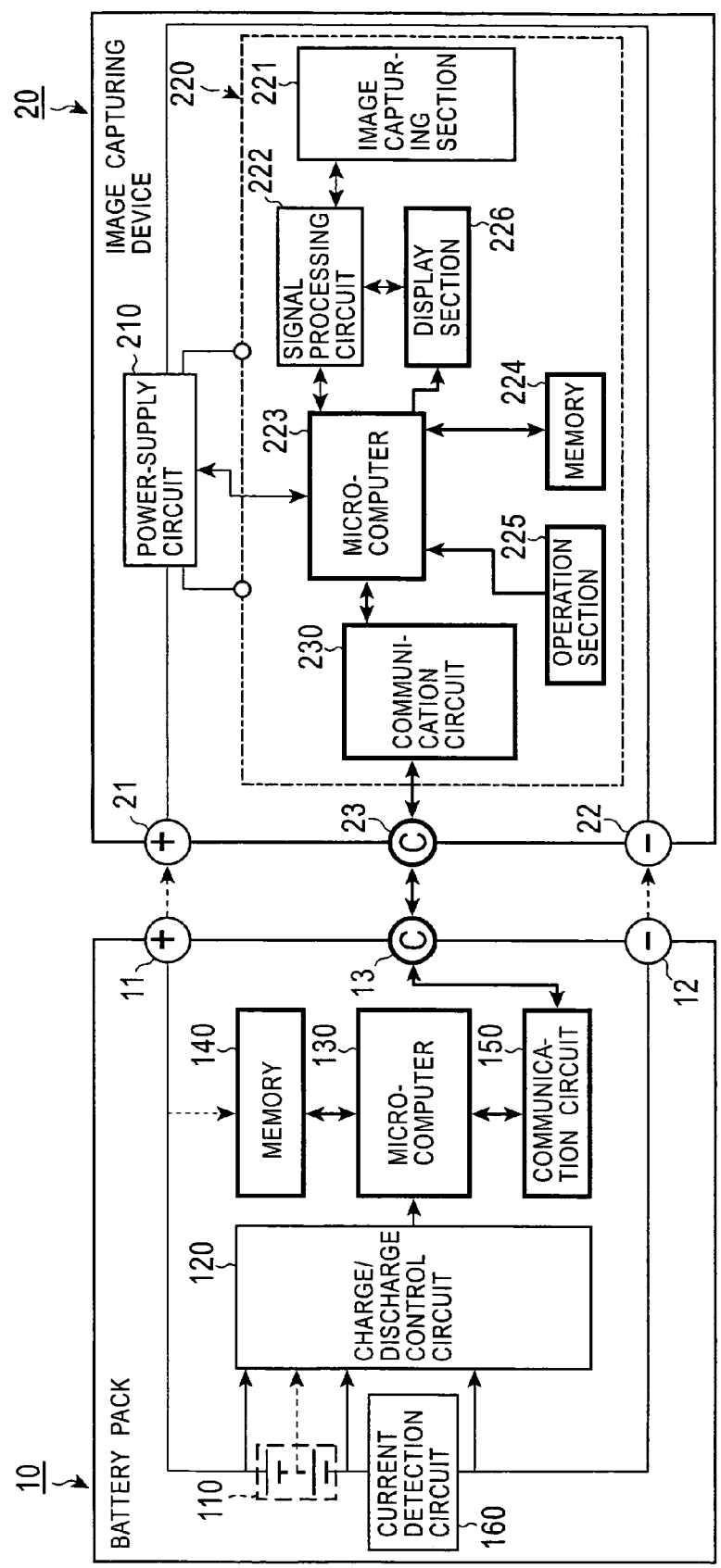
FIG. 4 is an illustration showing a communication path of setting information in the block diagram of FIG. 3.
Figure 5:
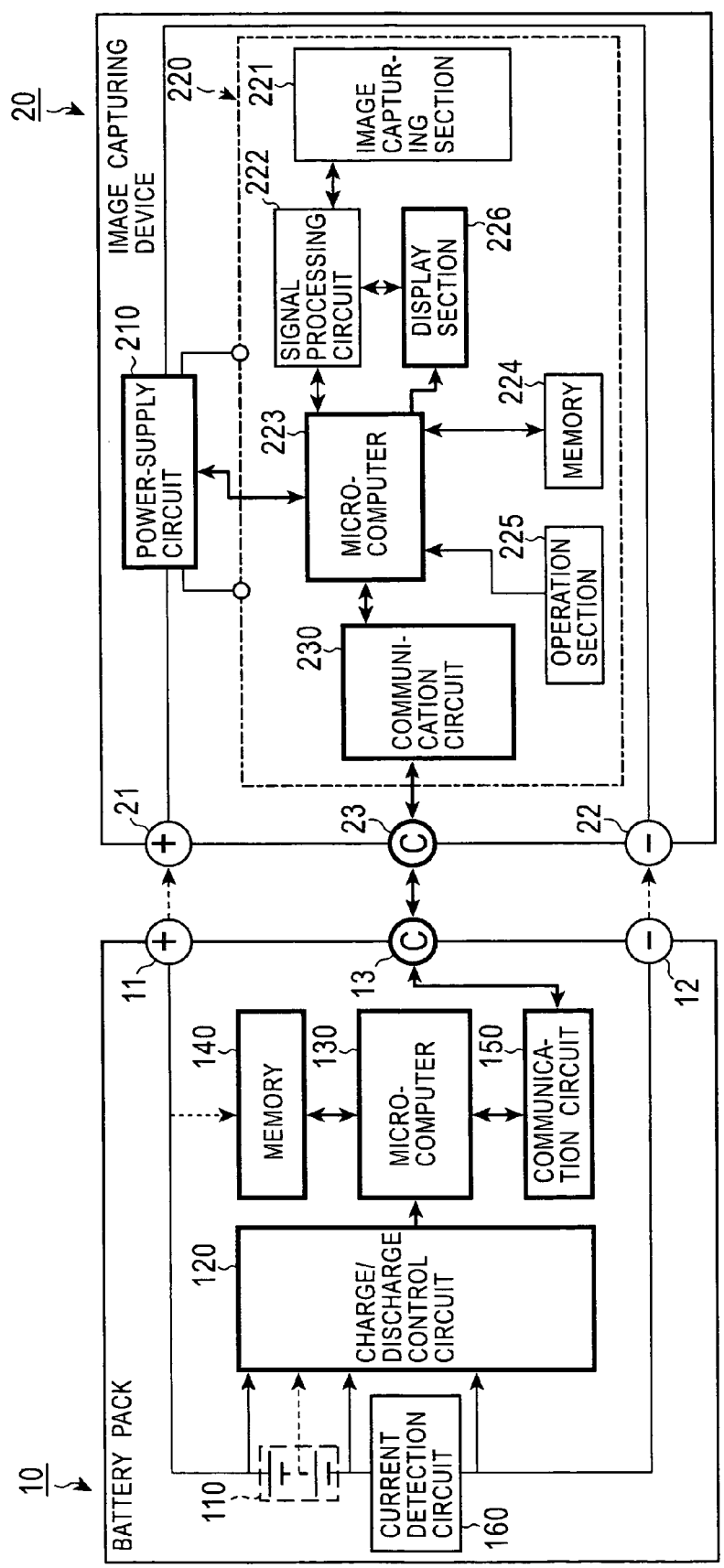
FIG. 5 is an illustration showing a communication path of battery cell information in the block diagram of FIG. 3.

The portion indicated by the thick line and the thick frame in FIG. 4 indicates the communication path of "setting information, and the portion indicated by the thick line and the thick frame in FIG. 5 indicates the communication path of battery cell information.

Figure 6:
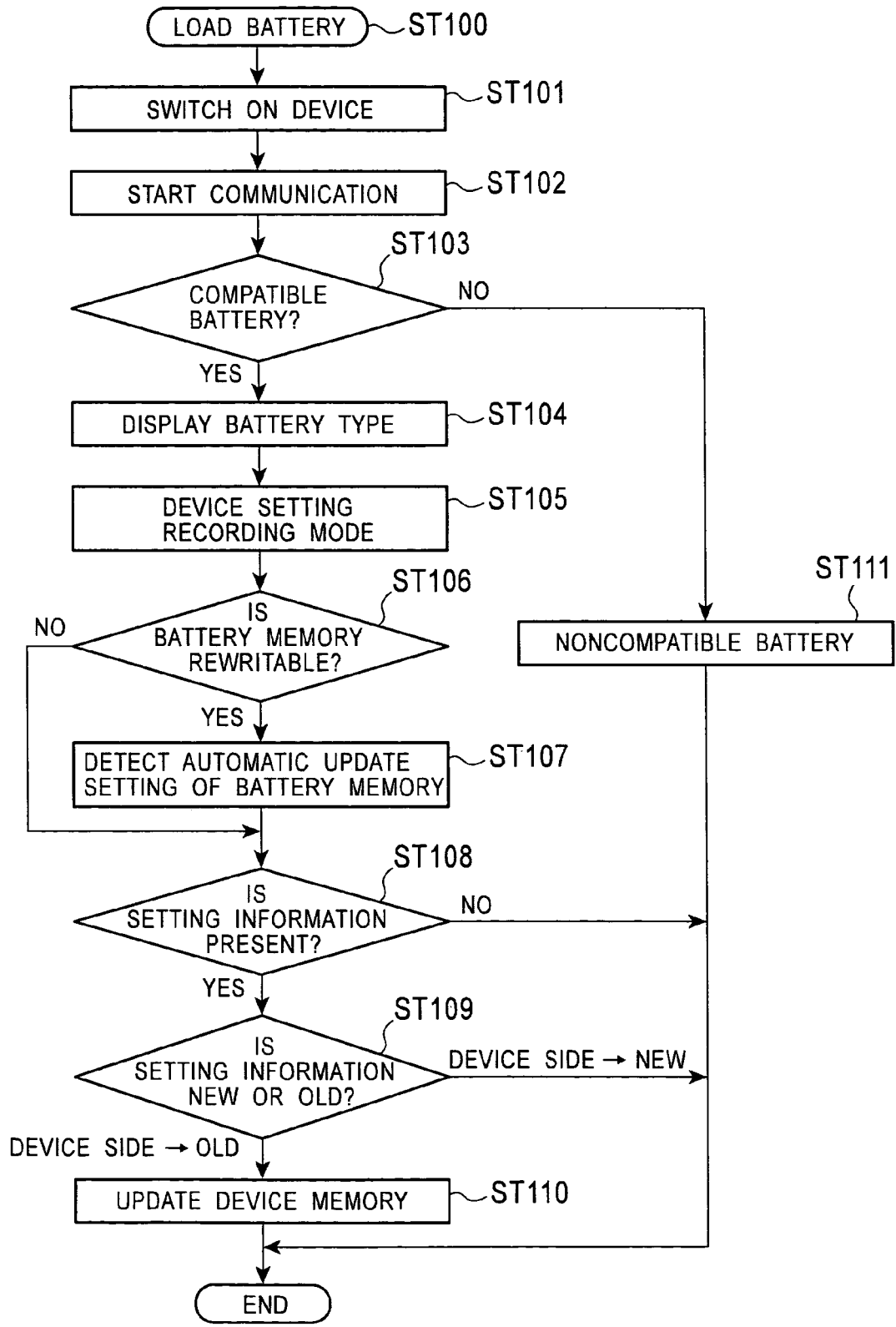
FIG. 6 is a flowchart showing operation steps to be performed when the battery pack is loaded into the electronic device.

First, a description will now be given, with reference to the flowchart in FIG. 6, of the operation to be performed when the category of battery pack and the writing set state of the incorporated memory are to be detected when the battery pack is loaded into the electronic device.

When the battery pack 10 is loaded into the image capturing device 20, the plus (+) terminal 11, the minus (−) terminal 12, and the communication terminal 13 of the battery pack 10 are connected to the plus (+) terminal 21, the minus (−) terminal 22, and the communication terminal 23 of the image capturing device 20, and the electrical power stored in the battery pack 10 is supplied to the image capturing device 20 (ST100).

When the power supply of the image capturing device 20 is turned on, a communication circuit 150 of the battery pack 10 and a communication circuit 230 of the image capturing device 20 start data communication via the communication terminal 13 and the communication terminal 23, respectively (ST101→ST102).

When the data communication with the image capturing device 20 is started, the microcomputer 130 of the battery pack 10 reads the battery category information set in the memory 140 and sends the read battery category information to the image capturing device 20 (ST102).

Furthermore, the microcomputer 130 of the battery pack 10 sends the battery category information through the communication circuit 150, and also sends the battery cell information collected by the charge/discharge control circuit 120 to the image capturing device 20. The battery cell information is sent via the communication terminal 13 in the same manner as for the battery category information.

Upon receiving the battery category information and the battery cell information sent from the battery pack 10, the microcomputer 223 of the image capturing device 20 discriminates whether or not the battery pack is compatible with device setting and recording type on the basis of this battery category information (ST103).

When the battery category information indicates not compatibility with device setting and recording type, similarly to the conventional battery pack, based on the battery cell information sent from the battery pack 10, the microcomputer 223 of the image capturing device 20 displays the remaining battery level, the available operating time, etc., on the display section 226 (ST103→ST110→end).

Figure 7:
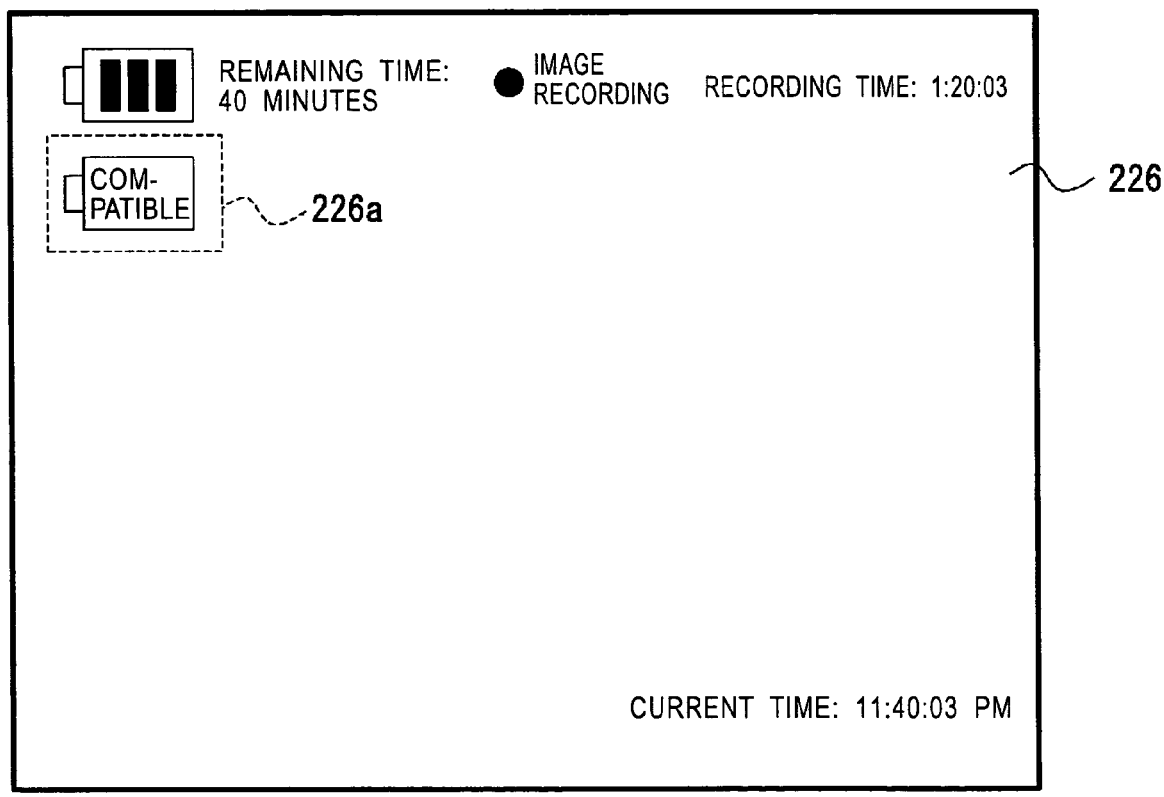
FIG. 7 shows an example of the display state of a display section in the electronic device (image capturing device) when the battery pack is loaded thereinto.

When the battery category information indicates compatibility with device setting and recording type, the microcomputer 223 of the image capturing device 20 displays an icon 226a indicating that the battery pack is compatible with device setting and recording type together with the information such as the remaining battery level, the recording time, and the current time on the display section 226 such as an EVF or a liquid-crystal screen, as shown in, for example, FIG. 7 (ST103→ST104).

Upon sending the battery category information and the battery cell information to the image capturing device 20, the battery pack 10 is placed in a device setting and recording mode for recording the setting information of the image capturing device 20, and sends the writing permission information set in the memory 140 to the image capturing device 20 (ST105).

Upon receiving the writing permission information sent from the battery pack 10, based on the writing permission information, the microcomputer 223 of the image capturing device 20 detects whether or not writing of the setting information into the memory 140 of the battery pack 10 is possible (ST106).

When writing into the memory 140 of the battery pack 10 is not possible, the process proceeds to step S108.

When the writing into the memory 140 of the battery pack 10 is possible, the microcomputer 223 detects the setting as to whether or not the setting information recorded in the memory 140 should be updated (rewritten) automatically (ST106→ST107).

Then, the microcomputer 223 of the image capturing device 20 sends, to the battery pack 10, a setting request signal for requesting the setting information recorded in the memory 140.

Upon receiving the setting request signal sent from the image capturing device 20, the microcomputer 130 of the battery pack 10 reads the setting information recorded in the memory 140 (hereinafter referred to as "setting information A") and sends it to the image capturing device 20 (ST108→ST109).

When the setting information is not recorded in the memory 140, the detection of the state of the battery pack is terminated (ST108→end).

Upon receiving the setting information A sent from the battery pack 10, the microcomputer 223 of the image capturing device 20 compares the updated information of the setting information A with the updated information of the setting information recorded in the memory 224 of the image capturing device 20 (hereinafter referred to as "setting information B") (ST109).

When the updated information of the setting information B recorded in the memory 224 of the image capturing device 20 is older, the setting information B recorded in the memory 224 of the image capturing device 20 is rewritten to the setting information A (ST109→ST110).

When the updated information of the setting information B recorded in the memory 224 of the image capturing device 20 is newer, the setting information B recorded in the memory 224 of the image capturing device 20 is used as is (ST109→end).

In this manner, when the battery pack is loaded into the electronic device, the state of the battery pack (the type, the writing set state for the memory of the battery pack, etc.) can be detected, and also the setting information on the electronic device side can be updated to the most recent setting information.

Figure 8:
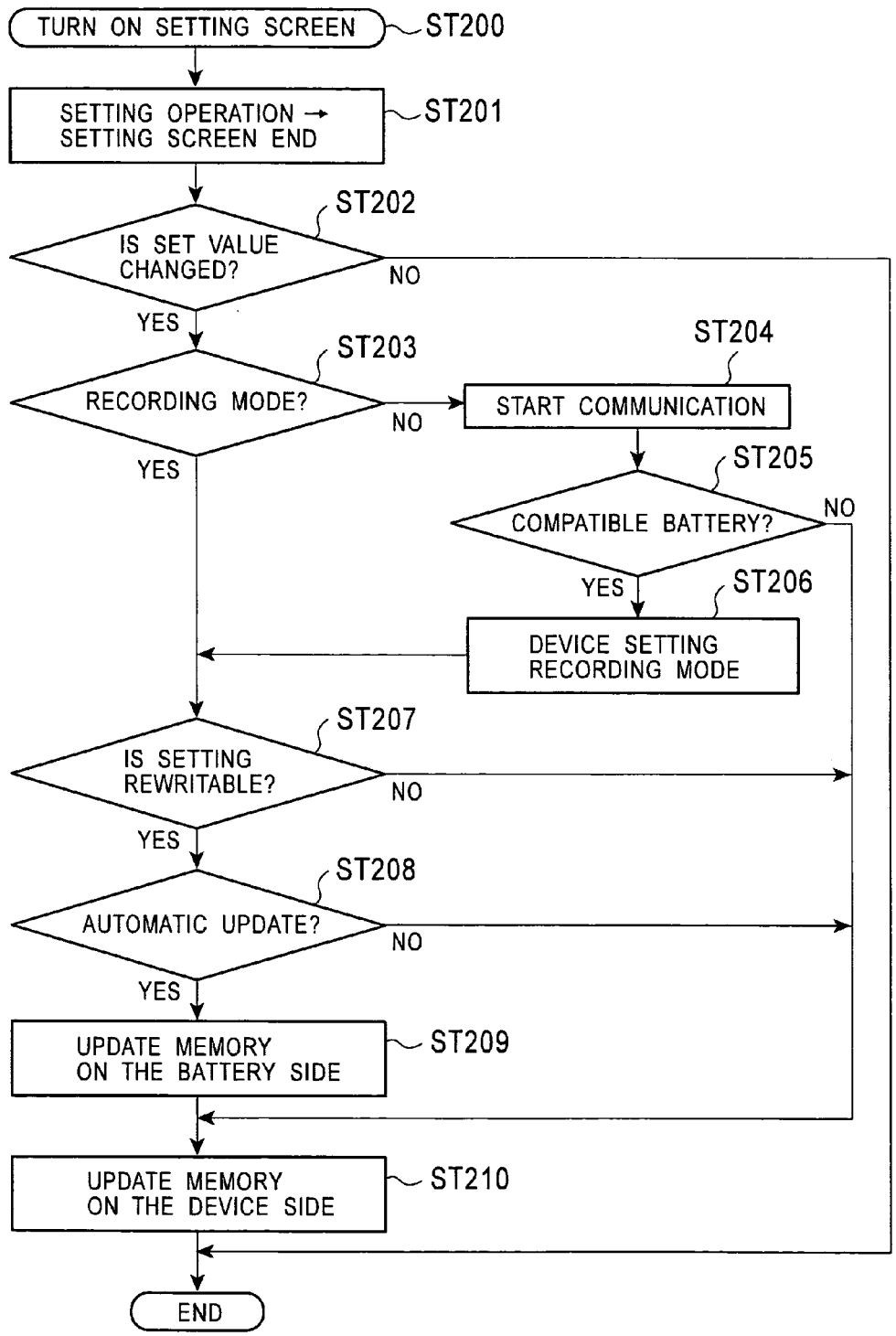
FIG. 8 is a flowchart showing operation steps to be performed when the setting information stored in the memory of the electronic device having the loaded battery pack is updated.

A description will now be given, with reference to the flowchart in FIG. 8, of the operation to be performed when the setting information stored in the memory of the electronic device having the loaded battery pack is updated.

The operation section 225 of the image capturing device 20 is operated to turn on the setting screen of the device so it is displayed on the display section 226 (such as an EVF or a liquid-crystal screen) (ST200).

Then, the setting information for setting functions, such as the image capturing mode, the type of recording medium, autofocus, and the electronic zoom, is set to desired values, and the setting screen is completed (ST201).

Upon detecting the setting completion, the microcomputer 223 of the image capturing device 20 compares the setting information which is set with the setting information stored in the memory 224 in order to discriminate whether or not the setting information is changed (ST202).

When the setting information is not changed, the processing ends without changing the setting information stored in the memory 224 of the image capturing device 20 (ST202→end).

When the setting information is changed, next, the microcomputer 223 of the image capturing device 20 sends, to the battery pack 10, a confirmation signal for confirming whether or not the battery pack 10 is in the device setting and recording mode for recording the changed setting information (ST202→ST203).

Upon receiving the confirmation signal sent from the image capturing device 20, the microcomputer 130 of the battery pack 10 reads the writing permission information recorded in the memory 140 and sends it, together with an acknowledgement signal indicating whether or not it is in the device setting and recording mode, to the image capturing device 20.

Upon receiving the acknowledgement signal sent from the battery pack 10, the microcomputer 223 of the image capturing device 20 discriminates whether or not the battery pack 10 is in the device setting and recording mode (ST203).

When the battery pack 10 is in the device setting and recording mode, next, the microcomputer 223 proceeds to a process of discriminating the writing permission information (ST203→ST207).

On the other hand, when the battery pack 10 is not in the device setting and recording mode, the microcomputer 223 of the image capturing device 20 sends a signal for requesting the battery category information to the battery pack 10 (ST204).

Upon receiving the request signal for the battery category information, the microcomputer 130 of the battery pack 10 reads the battery category information and the writing permission information stored in the memory 140, and sends them to the image capturing device 20 (ST204).

Upon receiving the battery category information sent from the battery pack 10, based on this battery category information, the microcomputer 223 of the image capturing device 20 discriminates whether or not the battery pack is compatible with device setting and recording (ST205).

When the battery pack is not compatible with device setting and recording, only the setting information of the memory 224 of the image capturing device 20 is updated (ST205→ST210).

When the battery pack is compatible with device setting and recording, then, the microcomputer 223 of the image capturing device 20 proceeds to a process of discriminating the writing permission information for the memory 140 of the battery pack 10 (ST205→ST206, ST207).

When the battery pack 10 is in the device setting and recording mode, the microcomputer 223 of the image capturing device 20 discriminates whether or not the setting information recorded in the memory 140 of the battery pack 10 can be rewritten on the basis of the writing permission information (ST207).

When the rewriting of the memory 140 of the battery pack 10 is not possible, only the setting information of the memory 224 of the image capturing device 20 is updated (ST207→ST210)

When the rewriting of the memory 140 of the battery pack 10 is possible, then, the microcomputer 223 makes a discrimination as to whether or not the setting information recorded in the memory 140 should be automatically rewritten (ST207→ST208).

When the memory 140 of the battery pack 10 is not automatically rewritten, only the setting information of the memory 224 of the image capturing device 20 is updated (ST208→ST210).

When the memory 140 of the battery pack 10 is automatically rewritten, the setting information recorded in the memory 140 is updated, and also, the setting information recorded in the memory 224 of the image capturing device 20 is updated (ST208→ST209, ST210).

In this manner, based on the writing permission information set in the memory of the battery pack, the setting information for the memory on the battery pack side and the electronic device side is updated.

Figure 9:
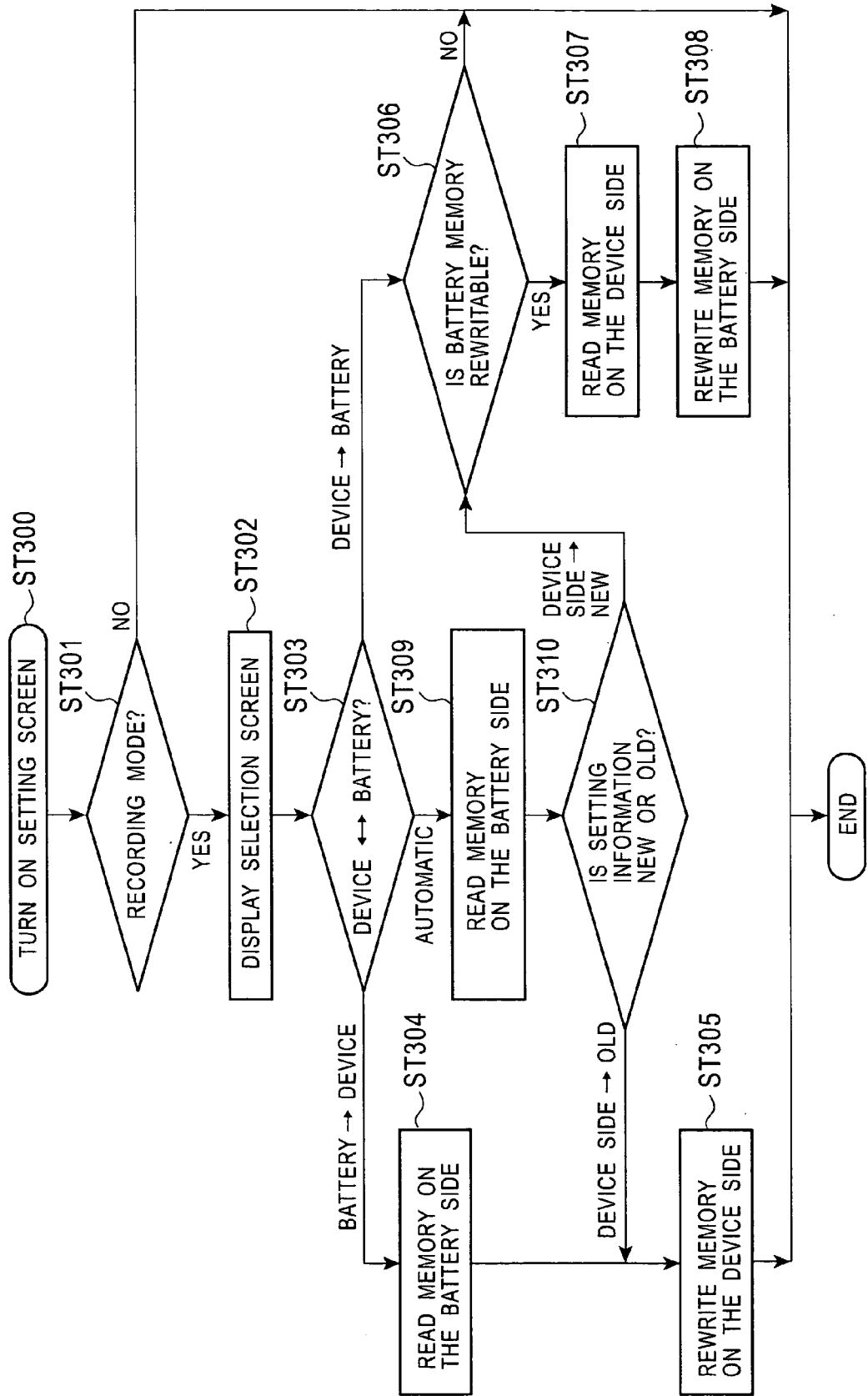
FIG. 9 is a flowchart showing operation steps to be performed when the memory content of the battery pack is updated (rewritten) to the setting information stored in the memory of the electronic device or when the memory content of the electronic device is updated (rewritten) to the setting information stored in the memory of the battery pack.

Next, a description will now be given, with reference to the flowchart in FIG. 9, of the operation to be performed when the memory content of the battery pack is updated (rewritten) to the setting information stored in the memory of the electronic device, or when the memory content of the electronic device is updated (rewritten) to the setting information stored in the memory of the battery pack.

When the setting screen for updating the setting information is turned on by operating the operation section 225 of the image capturing device 20, the microcomputer 223 of the image capturing device 20 sends, to the battery pack 10 via the communication circuit 230, a confirmation signal for confirming whether or not the battery pack 10 is in the device setting and recording mode for recording the setting information (ST300).

Upon receiving the confirmation signal sent from the image capturing device 20, the microcomputer 130 of the battery pack 10 sends an acknowledgement signal indicating whether or not the battery pack 10 is in the device setting and recording mode to the image capturing device 20 via the communication circuit 150 (ST300).

Upon receiving the acknowledgement signal sent from the battery pack 10, the microcomputer 223 of the image capturing device 20 makes a discrimination as to whether or not the battery pack 10 is in the device setting and recording mode (ST301).

When the battery pack 10 is not in the device setting and recording mode, the process for updating (rewriting) the setting information for the memory of the battery pack 10 or the image capturing device 20 is completed (ST301→end).

Figure 10:
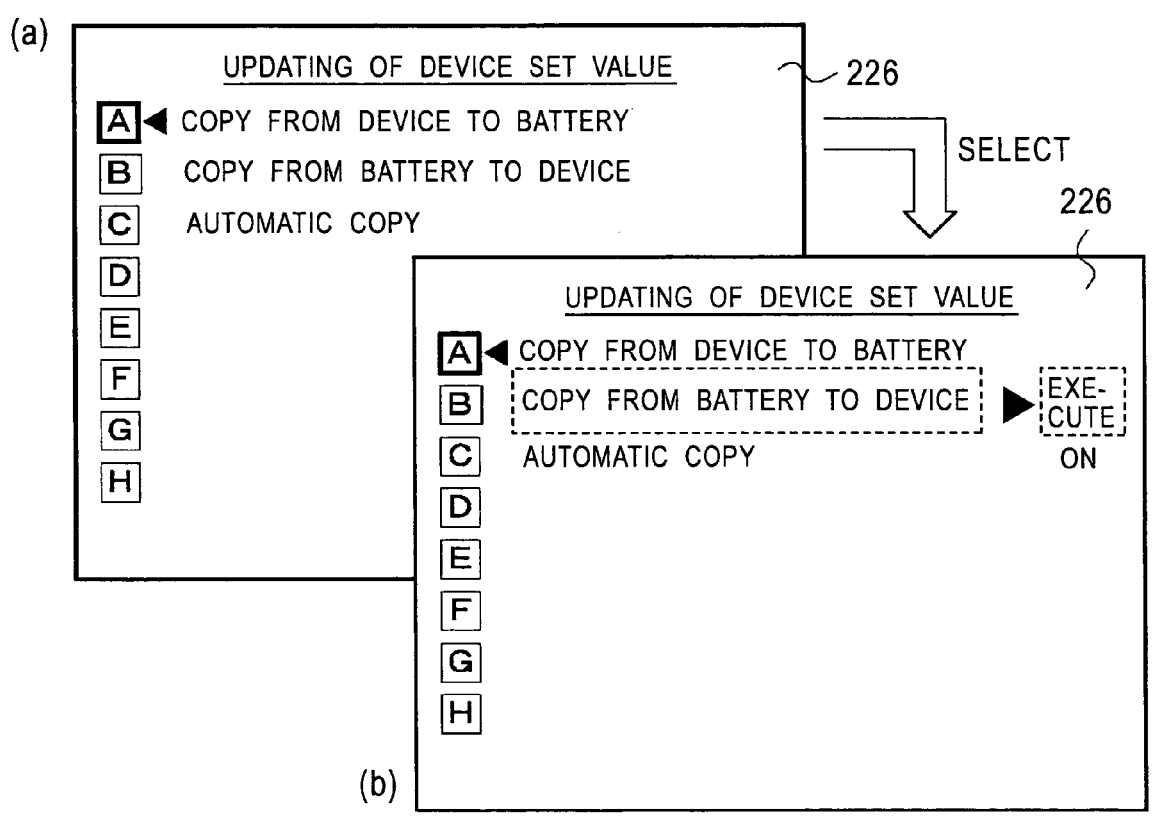
FIG. 10 shows an example of a selection menu screen when the operation is selected at the electronic device (image capturing device).

When the battery pack 10 is in the device setting and recording mode, the microcomputer 223 of the image capturing device 20 displays, on the display section 226, a selection menu screen for selecting copying of setting information in the battery pack to the memory in the device, copying of setting information in the device to the memory in the battery pack, or always keeping setting information to be stored in the memory at the most recent information; for example, a selection menu screen displays "copy from battery to device", "copy from device to battery", and "automatic copy", in part (a) of FIG. 10 (ST302).

Then, the operation section 225 of the image capturing device 20 is operated to select the desired menu (ST303).

When copying of setting information in the battery pack to the memory in the device is selected ("copy from battery to device" shown in part (b) of FIG. 10 is selected), the microcomputer 223 of the image capturing device 20 sends, to the battery pack 10, a signal for requesting the setting information recorded in the memory 140 (ST303→ST304).

Upon receiving the request signal from the image capturing device 20, the microcomputer 130 of the battery pack 10 reads the setting information recorded in the memory 140 (hereinafter referred to as "setting information A") and sends it to the image capturing device 20 (ST304).

Upon receiving the setting information A sent from the battery pack 10, the microcomputer 223 of the image capturing device 20 updates (rewrites) the setting information stored in the memory 224 (hereinafter referred to as "setting information B") to the setting information A of the battery pack 10 (ST305).

On the other hand, when copying of setting information in the device to the memory in the battery pack is selected, ("copy from device to battery" shown in part (b) of FIG. 10 is selected), the microcomputer 223 of the image capturing device 20 sends, to the battery pack 10, a confirmation signal for confirming whether or not the setting information can be written into the memory 140 of the battery pack 10 (ST303→ST306).

Upon receiving the confirmation signal sent from the image capturing device 20, the microcomputer 130 of the battery pack 10 reads the writing permission information set in the memory 140 and sends it to the image capturing device 20.

Upon receiving the writing permission information sent from the battery pack 10, the microcomputer 223 of the image capturing device 20 discriminates whether or not the setting information can be written into the memory 140 of the battery pack 10 on the basis of the writing permission information (ST306).

When the writing into the memory 140 of the battery pack 10 is not possible, the process for updating (rewriting) the setting information for the memory of the battery pack 10 is completed (ST306→end).

When the writing into the memory 140 of the battery pack 10 is possible, the setting information B recorded in the memory 224 of the image capturing device 20 is read and sent to the battery pack 10 (ST306→ST307).

Upon receiving the setting information B sent from the image capturing device 20, the microcomputer 130 of the battery pack 10 updates (rewrites) the setting information A stored in the memory 140 to the setting information B of the image capturing device 20 (ST308).

In this manner, operation from the electronic device side makes it possible to update (rewrite) the memory content of the battery pack to the setting information stored in the memory of the electronic device, or possible to update (rewrite) the memory content of the electronic device to the setting information stored in the memory of the battery pack.

Furthermore, for example, when "automatic copy" is selected on the selection menu screen shown in FIG. 10, first, the microcomputer 223 of the image capturing device 20 sends a signal for requesting the setting information A recorded in the memory 140 to the battery pack 10 via the communication circuit 230 (ST303→ST309).

Upon receiving the request signal sent from the image capturing device 20, the microcomputer 130 of the battery pack 10 reads the setting information A recorded in the memory 140 and sends it to the image capturing device 20 (ST309).

Upon receiving the setting information A sent from the battery pack 10, the microcomputer 223 of the image capturing device 20 compares the updated information of the setting information A with the updated information of the setting information B stored in the memory 224 (ST310).

When the updated information of the setting information B recorded in the memory 224 of the image capturing device 20 is older, the setting information B recorded in the memory 224 of the image capturing device 20 is rewritten to the setting information A (ST310→ST305).

When the updated information of the setting information B recorded in the memory 224 of the image capturing device 20 is newer, the microcomputer 223 of the image capturing device 20 sends, to the battery pack 10, a confirmation signal for confirming whether or not the setting information can be rewritten into the memory 140 of the battery pack 10 (ST310→ST306).

Upon receiving the confirmation signal sent from the image capturing device 20, the microcomputer 130 of the battery pack 10 reads the writing permission information set in the memory 140 and sends it to the image capturing device 20.

Based on the writing permission information sent from the battery pack 10, the microcomputer 223 of the image capturing device 20 discriminates whether or not the setting information can be written into the memory 140 of the battery pack 10 (ST306).

When the writing into the memory 140 of the battery pack 10 is not possible, the process for updating (rewriting) the setting information for the memory of the battery pack 10 is completed (ST306→end).

When the writing into the memory 140 of the battery pack 10 is possible, the setting information B recorded in the memory 224 of the image capturing device 20 is read and sent to the battery pack 10 (ST306→ST307).

Upon receiving the setting information B sent from the image capturing device 20, the microcomputer 130 of the battery pack 10 updates (rewrites) the setting information A stored in the memory 140 to the setting information B of the image capturing device 20 (ST308).

In this manner, the setting information to be stored in the memory of the electronic device and the battery pack is updated to the most recent setting information.

What is claimed is:

1. A battery pack comprising:
   connection terminals for supplying electrical power to an electronic device,
   wherein the battery pack is detachable from the electronic device and functions of the electronic device are set based upon setting information received from the battery pack; and
   a communication terminal for performing data communication between the electronic device and the battery pack;
   setting information storage means for storing setting information for setting functions of said electronic device;
   setting information control means for controlling, in accordance with a control signal for said electronic device, processes for writing and reading said setting information to and from said setting information storage means; and
   communication means for transmitting and receiving said setting information controlled by said setting information control means via said communication terminal.

2. A battery pack according to claim 1, wherein said setting information storage means stores information on the electrical power of the battery pack together with said setting information.

3. A battery pack according to claim 1, wherein said communication means transmits the information on the electrical power of the battery pack via said communication terminal.

4. An electronic device that can be driven with a detachable battery pack having incorporated therein storage means for storing setting information for setting functions of the electronic device, said electronic device comprising:

connection terminals, which are connected to said battery pack and which receive the supply of electrical power when the battery pack is attached to the electronic device;

a communication terminal, which is connected to said battery pack, for performing data communication when the battery pack is attached to the electronic device;

setting information operation means for controlling operations for writing and reading said setting information to and from the storage means of said battery pack; and communication means for transmitting and receiving, via said communication terminal, said setting information, which is operated by said setting information operation means, wherein the battery pack provides setting information to set functions of the electronic device.

5. An electronic device according to claim 4, wherein said setting information operation means has a function for updating setting information set in the electronic device to setting information read from the storage means of said battery pack.

6. An electronic device according to claim 4, wherein said setting information operation means has functions for comparing the setting information read from the storage means of said battery pack with the setting information set in the electronic device, and for updating the setting information of the storage means of the battery pack or the setting information set in the electronic device to the most recent setting information.

* * * * *